Feb. 17, 1970 G. C. DRISCOLL ET AL 3,496,551

TASK SELECTION IN A MULTI-PROCESSOR COMPUTING SYSTEM

Filed July 13, 1967 11 Sheets-Sheet 1

INVENTORS
GRAHAM C. DRISCOLL
MEIR M. LEHMAN

BY [signature]
ATTORNEY

Feb. 17, 1970 G. C. DRISCOLL ET AL 3,496,551

TASK SELECTION IN A MULTI-PROCESSOR COMPUTING SYSTEM

Filed July 13, 1967 11 Sheets-Sheet 3

Feb. 17, 1970 G. C. DRISCOLL ET AL 3,496,551

TASK SELECTION IN A MULTI-PROCESSOR COMPUTING SYSTEM

Filed July 13, 1967 11 Sheets-Sheet 8

United States Patent Office 3,496,551
Patented Feb. 17, 1970

3,496,551

TASK SELECTION IN A MULTI-PROCESSOR COMPUTING SYSTEM

Graham C. Driscoll, Yorktown Heights, and Meir M. Lehman, New York, N.Y., assignors to International Business Machines Corporation, Armonk, N.Y., a corporation of New York Filed July 13, 1967, Ser. No. 653,097
Int. Cl. G11b *13/00;* G06f *1/00, 7/00*
U.S. Cl. 340—172.5 13 Claims

ABSTRACT OF THE DISCLOSURE

A system for assigning tasks from a plurality of task queues in a large multi-processor computing system wherein each individual processor has a separate Interaction Controller for communicating with a central control unit and memory and with other similar processors within the system. The present system provides special hardware within each Interaction Controller and includes means for interrogating a plurality of task queues stored at a central storage location available to all controllers and for determining from said queues which queues require service and for selecting tasks therefrom accordingly. Additional features are provided whereby each queue may be assigned a quota of processors available to perfrom tasks within same. Said means further includes controls for assuring that each queue will have up to its quota as long as tasks are present in same before a new processor requesting a task will be assigned to another queue whose quota is already full.

CROSS REFERENCES TO RELATED APPLICATIONS

U.S. patent application No. 607,040 of H. P. Schlaeppi filed Jan. 3, 1967 entitled "Control Mechanism for a Multi-Processor Computing System" discloses an overall multi-processor computing system wherein each processor has its own individual Interaction Controller for communicating with a central processor or control unit and also with other processors for assigning tasks, requesting assistance from other processors in the system, for notifying other processors that a given job within the present processor is complete, etc. This application should be referred to for the details of such an overall computer system configuration.

U.S. patent application No. 653,535 of G. C. Driscoll filed July 14, 1967 and entitled "Communication Arrangement in Data Processing System" discloses a multi-processor system of the type described herein and also in the above-referenced copending application wherein each Interaction Controller associated with each Processor is provided with means for addressing any desired Interaction Controller or a central control console over a Common Data Bus.

BACKGROUND OF INVENTION

Current developments in the computer industry have caused an ever increasing trend towards larger and more sophisticated electronic computers. Perhaps the largest single contribution to these trends is the continued progress in the solid state electronic arts and miniaturization. In particular, the high availability of integrated circuit technology to the production of computers has made distinctly possible extremely large sophisticated computing systems capable of extremely high speed operation. However, it is generally believed that the sophistication level of single computer systems is rapidly being reached. Accordingly, the attention of systems designers is turning ever increasingly towards the concept of multi-processing computing systems wherein a particular large job may be broken up into individual segments or tasks and performed in parallel in two or more separate processors wherever possible.

The primary problem of such multi-processing systems is that they must have adequate facilities for controlling the application of the system resources including multi-processors, storage space, and Input/Output devices to the work load presented to it by various users. Such control functions are generally referred to as executive functions and are determined by the operational requirements of potential users.

The design goal of any multi-processor computing system is to achieve high overall efficiency while meeting a set of rather general operating criteria which may be summarized by the requirements that an individual user receive the full benefits from large pools of system resources and information so as to secure service within a time interval specified by said user at the lowest possible cost.

Before proceeding with the description of the present invention, certain terms should be defined for purposes of the description. A multi-processor is defined as a computing system that comprises a number of autonomous processors having access to a common memory and capable of executing programs concurrently. The term "job" is used to designate the entire activity or program that is engendered in the system by the acceptance of an individual user request for computational time. It is assumed that any multi-processor is capable of processing several independent jobs concurrently.

As is well known, many jobs can be dissected into sequences of instructions which are logically almost independent of each other. These sequences are referred to herein as "Tasks." Given a job that is composed of several tasks, a multi-procssor can be made under certain circumstances to process these concurrently. This mode of operation is termed parallel processing. Two distinct advantages, considered by computer designers, have caused interest in multi-processor system configurations. The first of these is more efficient utilization of the overall system due to potential capability of keeping the processors working substantially continuously and thus providing a greater throughput per dollar and the second is a question of reliability. In the latter instance assuming one unit or processor of a multi-processing system fails, the remainder of the system would be able to continue performing the particular jobs and tasks without being particularly affected by the failure of the single unit.

The latter of the above two situations is an obvious advantage of such a system, however, in the case of the former, a number of assumptions must be made. In order for a multi-processing system to operate efficiently, the system controls or executive controls must efficiently and with minimum time delay assign successive tasks to the various processors of the system as they become available in order to efficiently utilize the computational ability of the system. It is this latter area that has received the most attention in the multi-processing area in recent years as the solution of such problems is by no means trivial.

Assuming that a supervisory program is provided which is capable of separating a plurality of jobs coming from one or more users into a greater plurality of individual tasks, a major problem still arises as to the best manner in which to assign these tasks to the various individual processing units within a multi-processing system. It may be reasonably assumed that individual tasks will be categorized or allocated on a queue basis, that is assigned to different lists or queues of jobs to be done based either on time priority or upon the type of job involved.

Once these individual tasks are broken up into various queues or lists, it then becomes necessary to assign such tasks on some predetermined basis to a multi-processing system.

The above-cited copending applications disclose a multi-processing computing system organization wherein each processor of the system has its own Interaction Controller which aids materially in performing certain executive functions, such as communications with the central control, communications between other processors within the system, etc. These dockets disclose a system wherein the Interaction Controller for a particular processor may be performing such tasks as requesting the next task to be performed by a particular processor as soon as its current task is completed.

SUMMARY OF INVENTION AND OBJECTS

It has now been found that a very efficient task selection system may be provided in a multi-processor computing system wherein each processor has its own "Interaction Controller" capable of communicating with both a central control mechanism and also other processors within the system. By providing hardware within each Interaction Controller for interrogating the central system list of task queues, a considerably optimized task selection procedure may be established. In addition to systematically assigning new tasks to a processor when a current one is computed, a quota system established by the supervisory program may be observed wherein each queue is assured of a certain number of processors working on same. Additionally, if one queue is exhausted, the processors which would normally be allotted to it may be distributed throughout the remainder of the queues which are not currently empty even though they may have their current quotas satisfied.

It is accordingly a primary object of the present invention to provide an improved task selection mechanism for a multi-processor computing system.

It is another object of the present invention to provide such a task selection system, wherein the Interaction Controller for each processor performs the executive function of selecting a next task.

It is yet another object of the present invention to provide such a system wherein a next task is requested while a processor is performing a current task in order to better utilize the system capability.

It is still a further object of the invention to provide such a task selection system wherein each queue may specify a quota of processors which should normally be working on same.

It is a further object of the present invention to provide such a quota system wherein once a queue is empty, the processors which would normally be allotted for performing tasks in that queue will automatically operate on other queues with minimum of delay.

The foregoing and other objects, features and advantages of the invention will be apparent from the following more particular description of a preferred embodiment of the invention, as illustrated in the accompanying drawings.

DESCRIPTION OF THE DISCLOSED EMBODIMENT

The objects of the present invention are accomplished in general by a multi-processor system including a plurality of individual processor units. Individual control means are associated with each unit for addressing an overall or central control unit for assignment of individual tasks to each processor unit. The central control unit includes memory means for storing a plurality of predetermined task queues. Means are provided in each individual control unit for preferentially addressing a predetermined task queue in the central memory unit for assignment of the next task. Means associated with each task queue indicate whether a predetermined desired number of processors is currently working on that particular queue and operate to refer a processor requesting a new task to the next queue in the scanning order if said predetermined number of processors is currently working on said queue. In the remainder of this description, the word controller will be used to denote the individual controllers or Interaction Controllers associated with each processor.

Further means are provided in each individual control means for resetting the status of a particular queue when a task is accepted therefrom both as to the change of the number of tasks in said queue and also for resetting the quota status of said que. Further means are provided in each individual controller for preventing other controllers associated with other processors from attempting to select the same task. An additional feature of the present system includes the provision of means whereby all other controllers in the system are notified when a particular controller extracts the last member or task from a particular queue, so that the queue is effectively empty. Similarly, means are provided for indicating to all other controllers when the quota for a particular queue being serviced by a given processor becomes filled.

Figure 1:
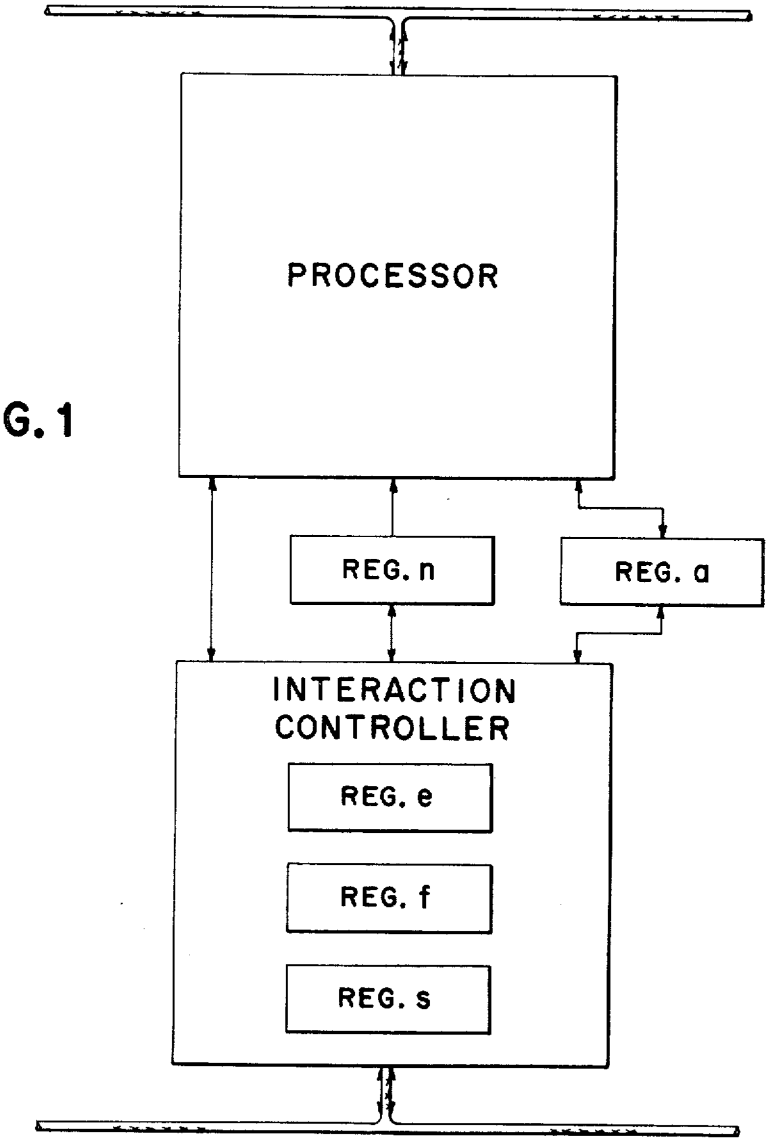
FIG. 1 is a generalized functional block diagram indicating a single processor and its Interaction Controller together with a number of the more important functional components thereof.
Figures 2, 2A:
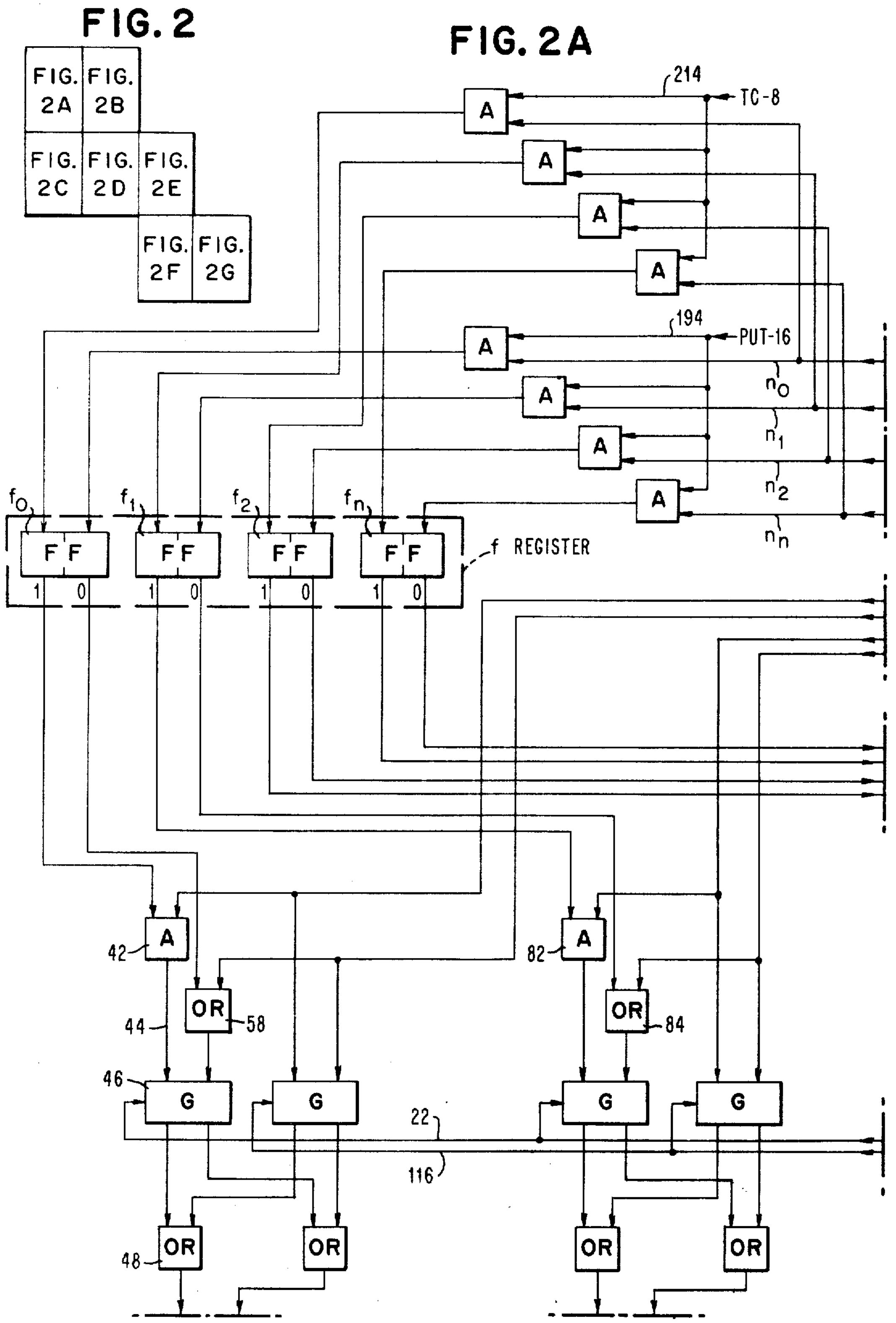
FIG. 2 is an organizational diagram of FIGS. 2A–G.
FIGS. 2A–G comprise a logical schematic diagram of the "Task Selection" portion of Interaction Controller instructed in accordance with the teachings of the present invention.
Figure 2B:
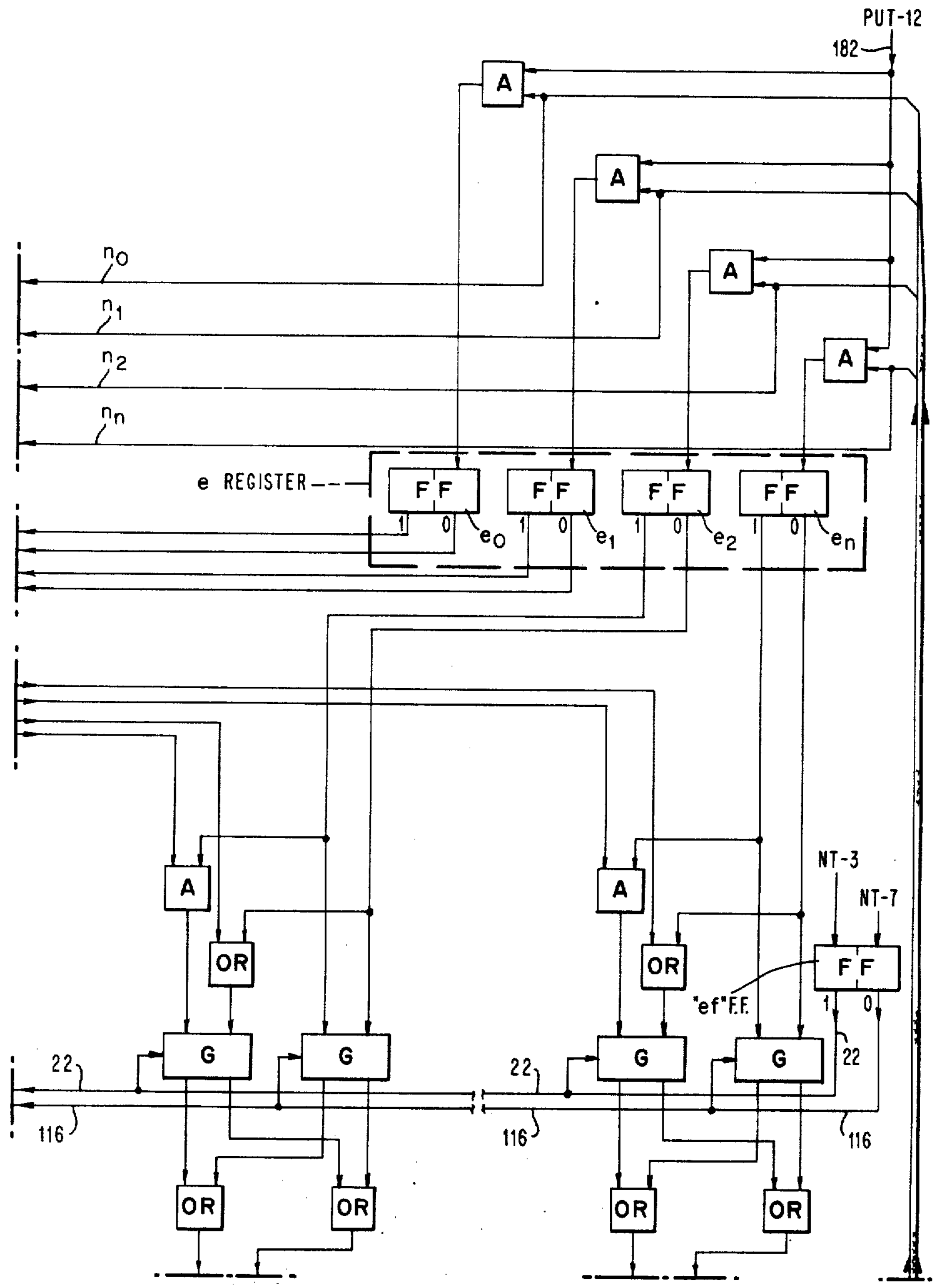
Figure 2C:
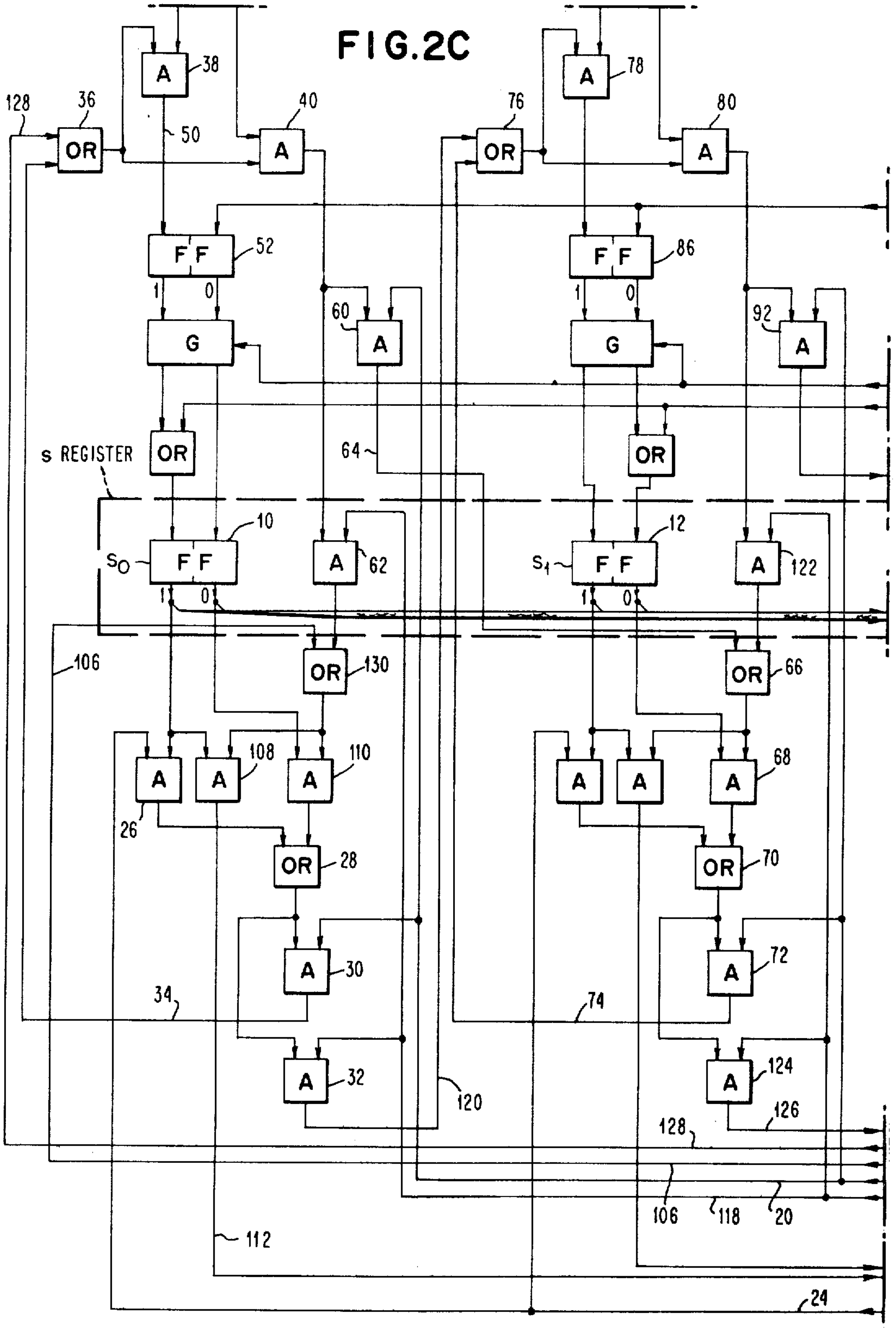
Figure 2D:
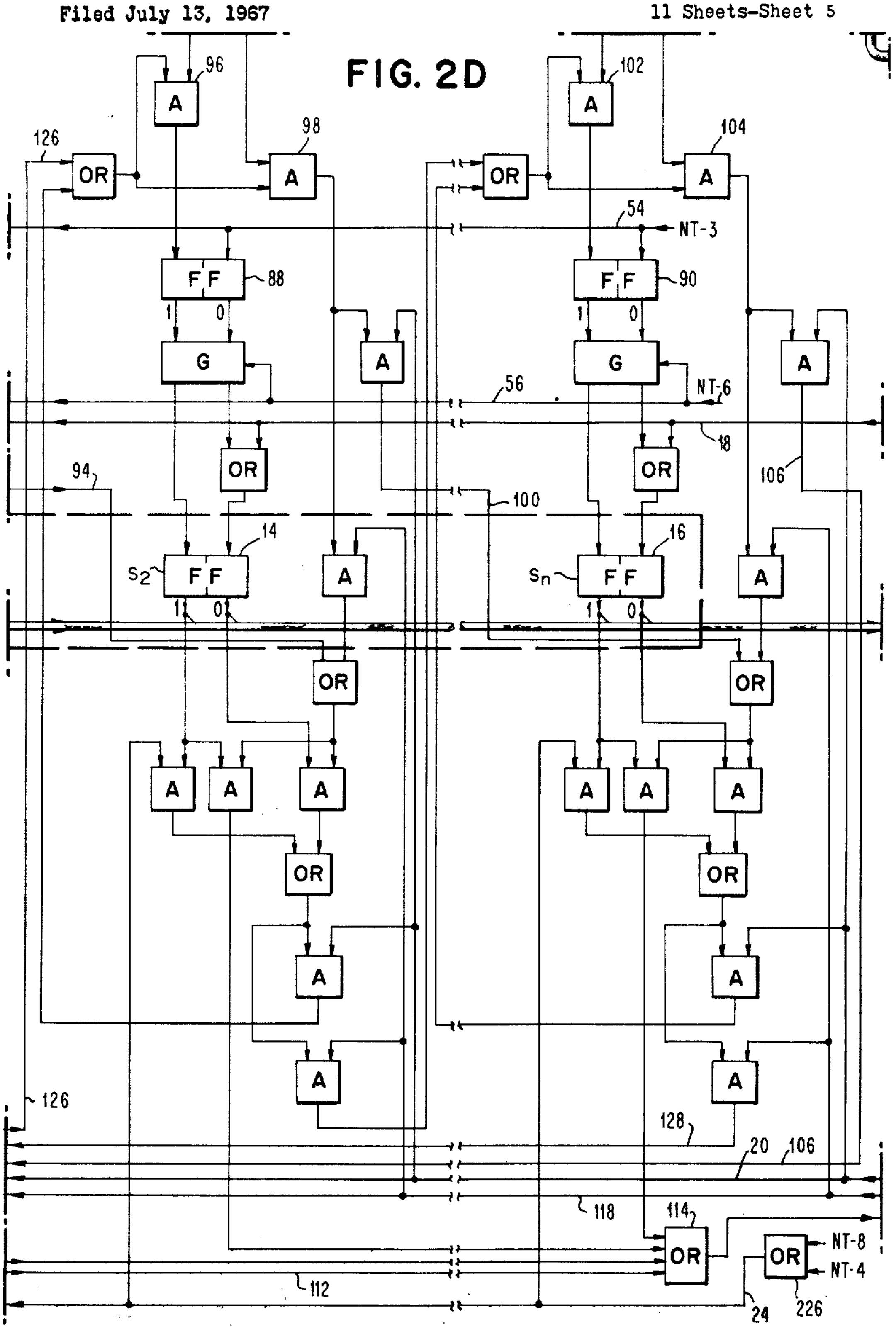
Figure 2E:
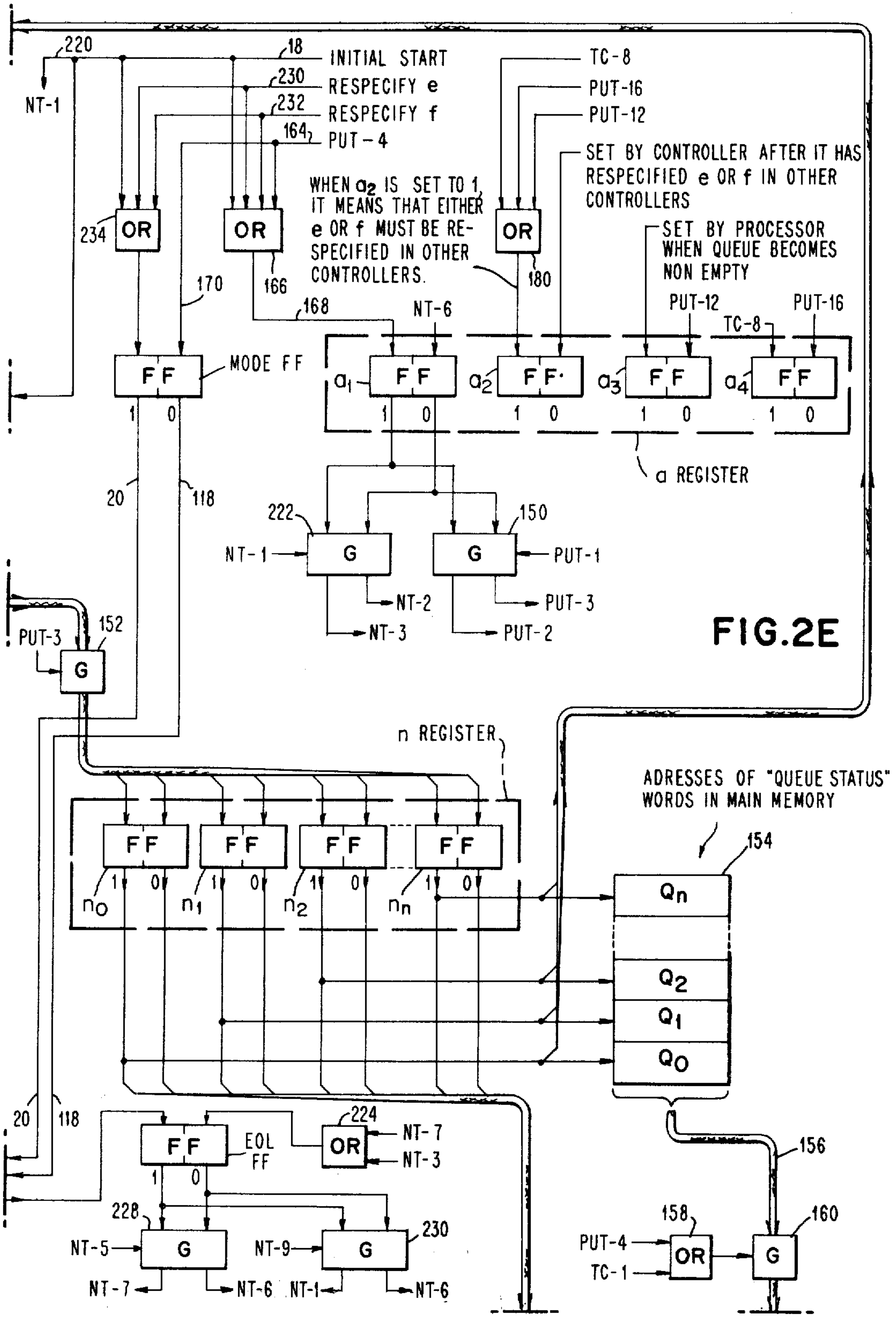
Figure 2F:
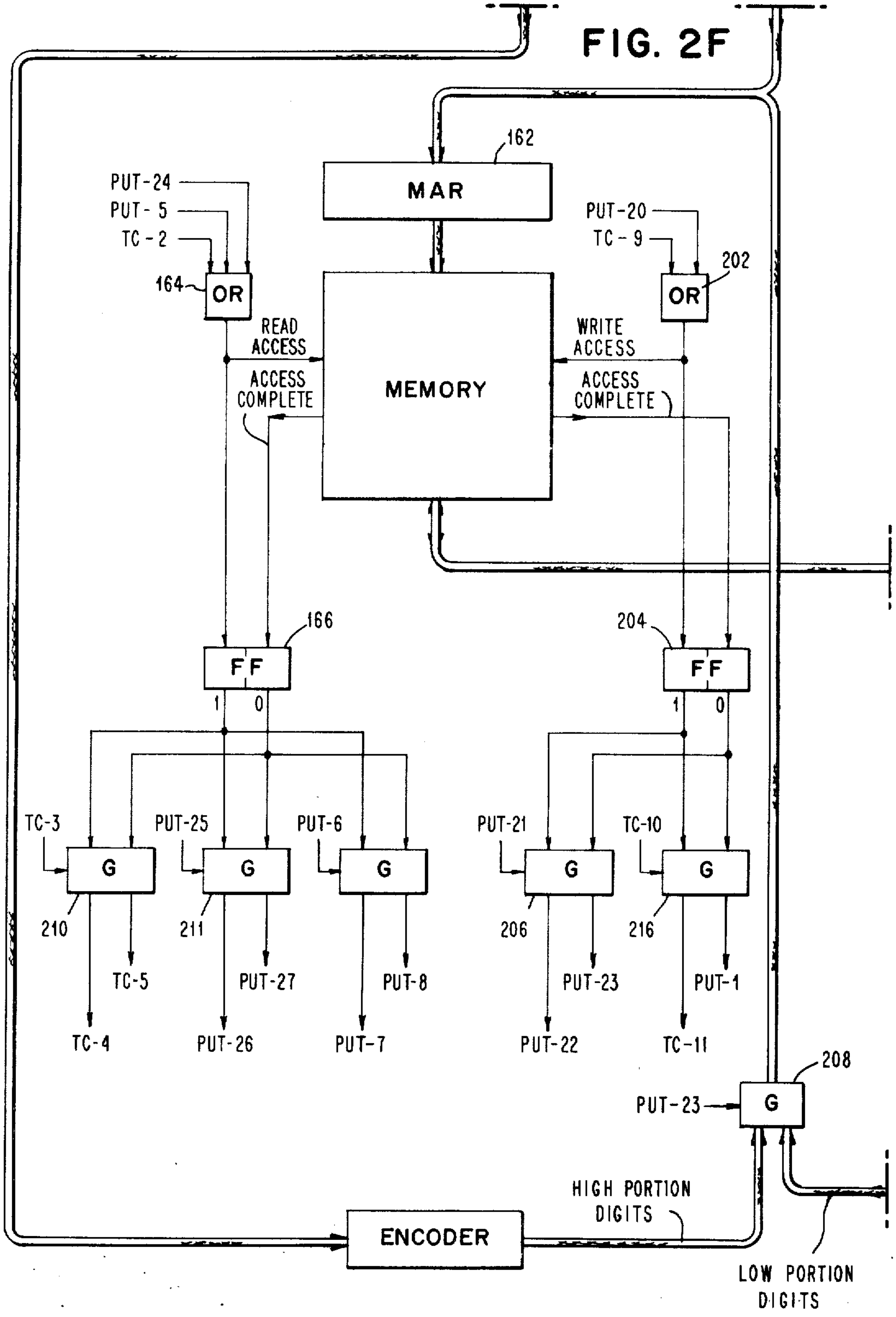
Figure 2G:
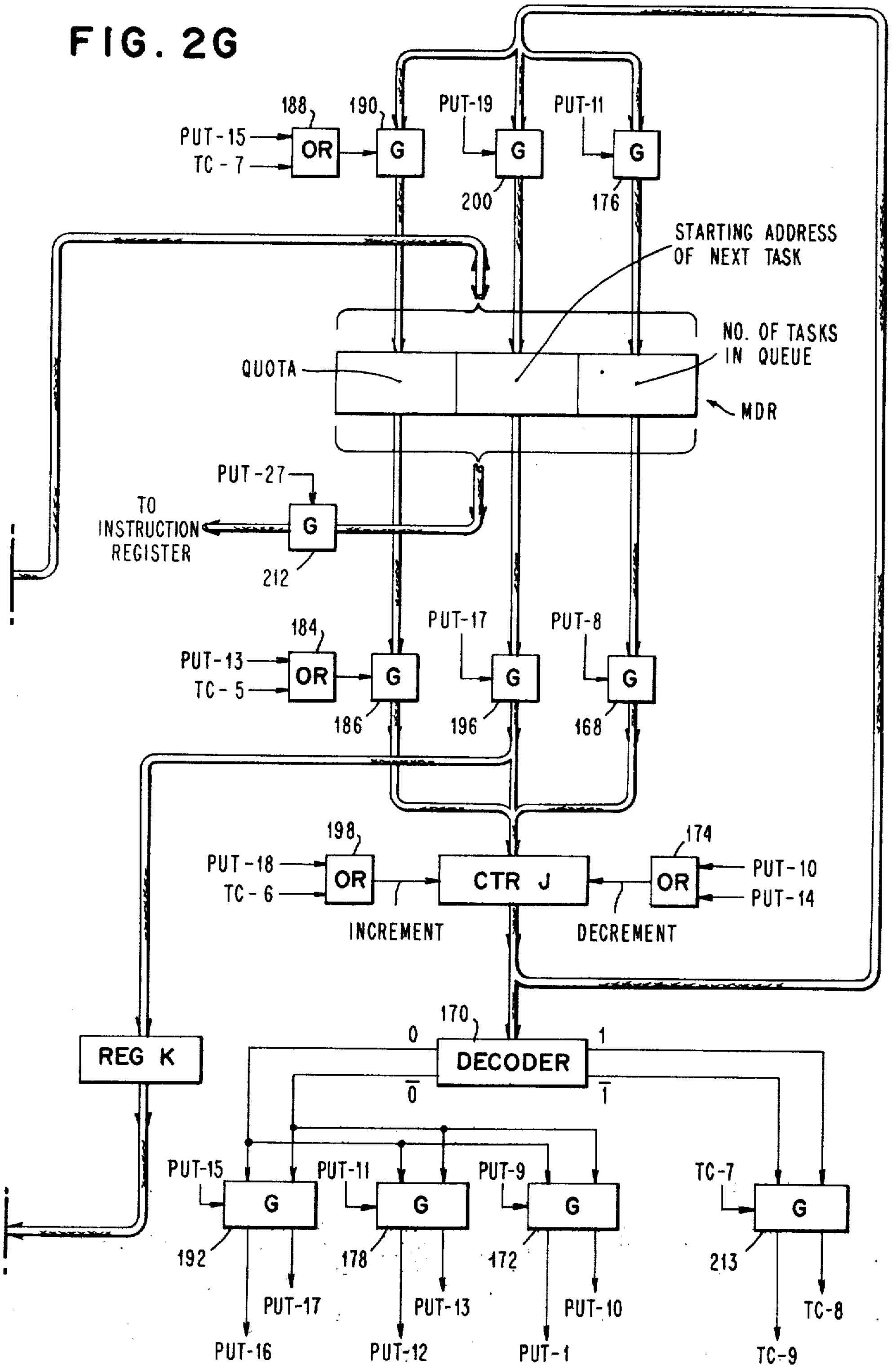
Figures 3, 3A:
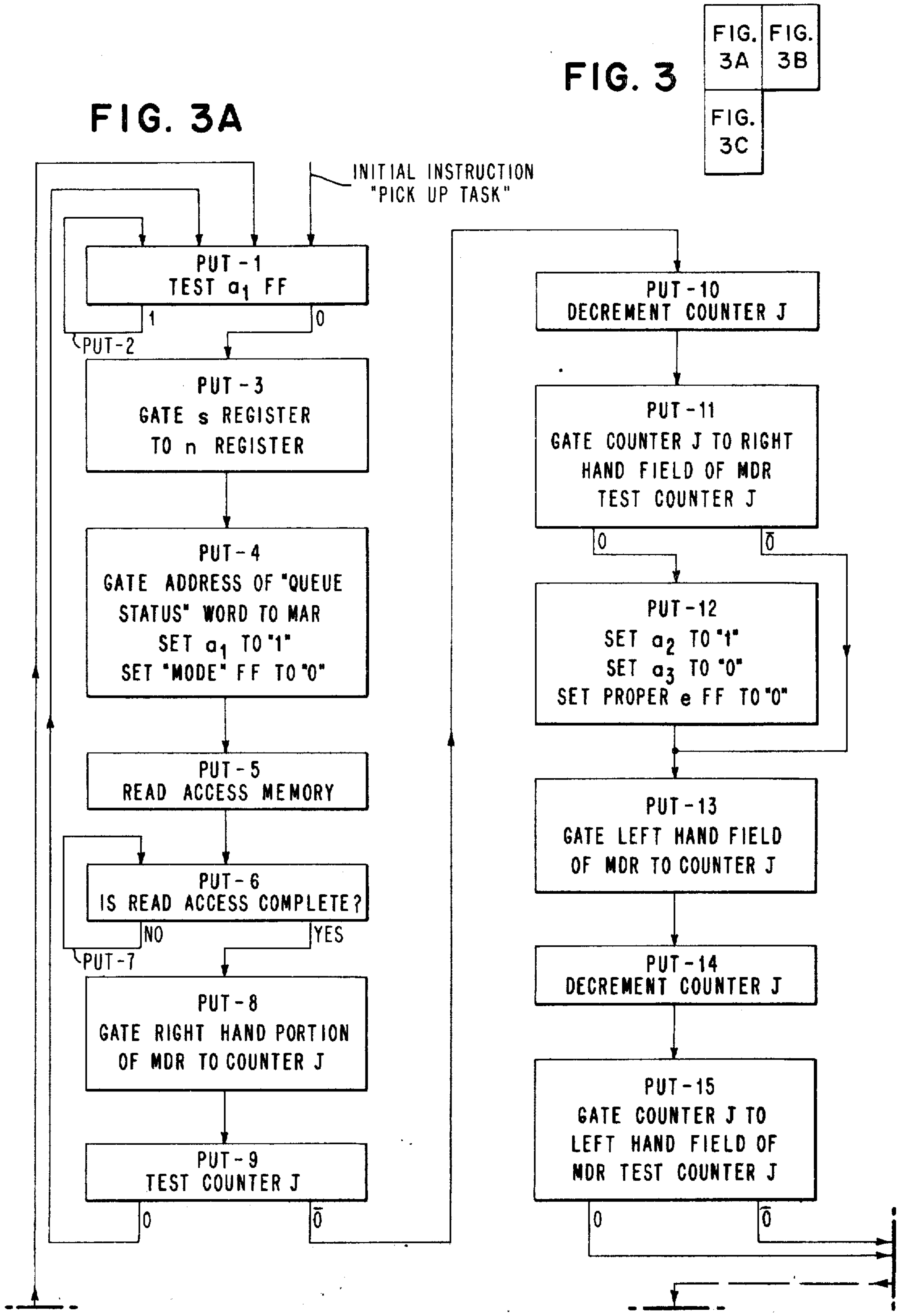
FIG. 3 is an organizational drawing of the flow charts of FIGS. 3A–C .
FIGS. 3A–C comprise a flow chart of the two principal operational sequences of a "Task election" sequence of the preferred embodiment of the present invention detailed in FIGS. 3A–C.
Figure 3B:
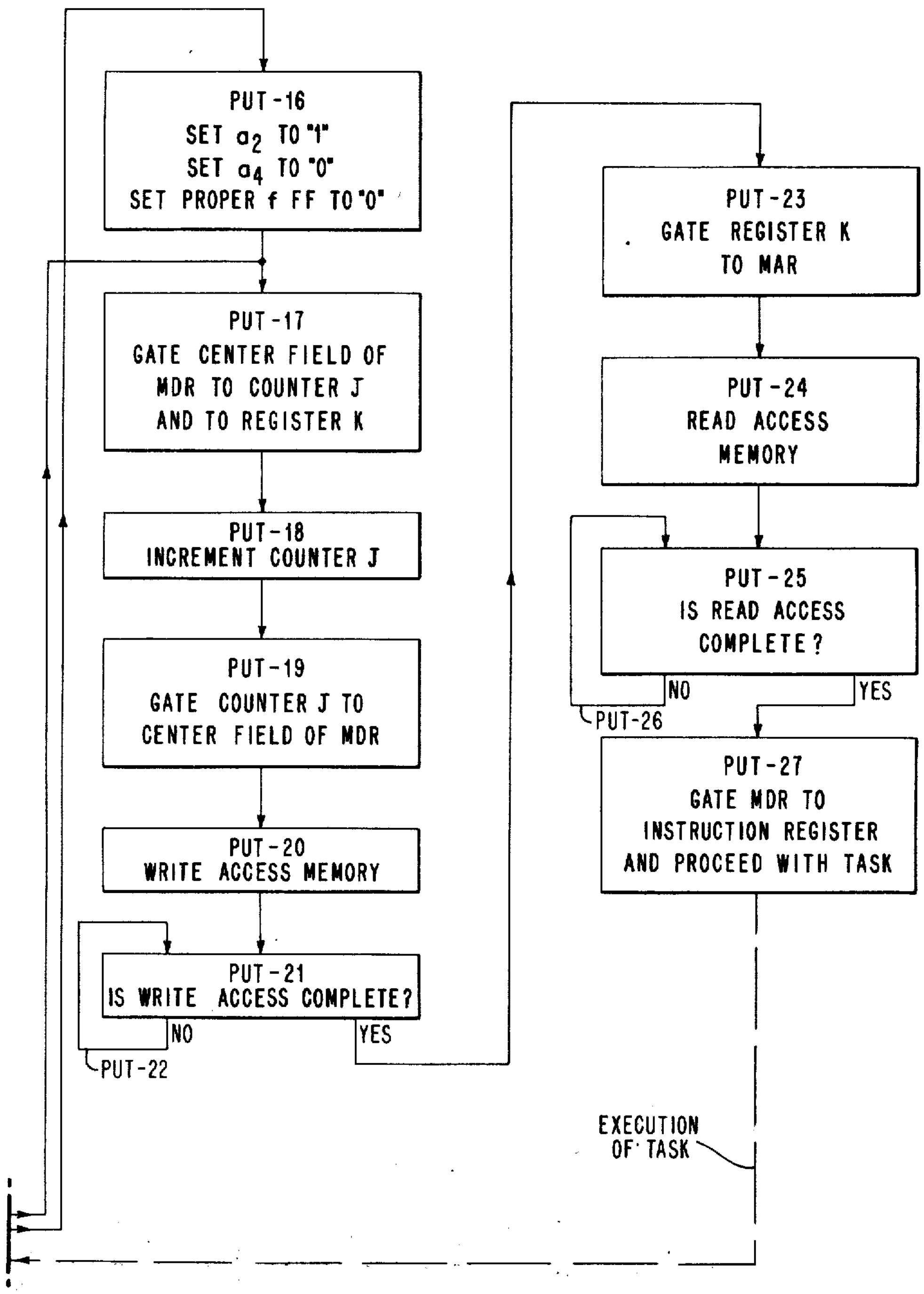
Figure 3C:
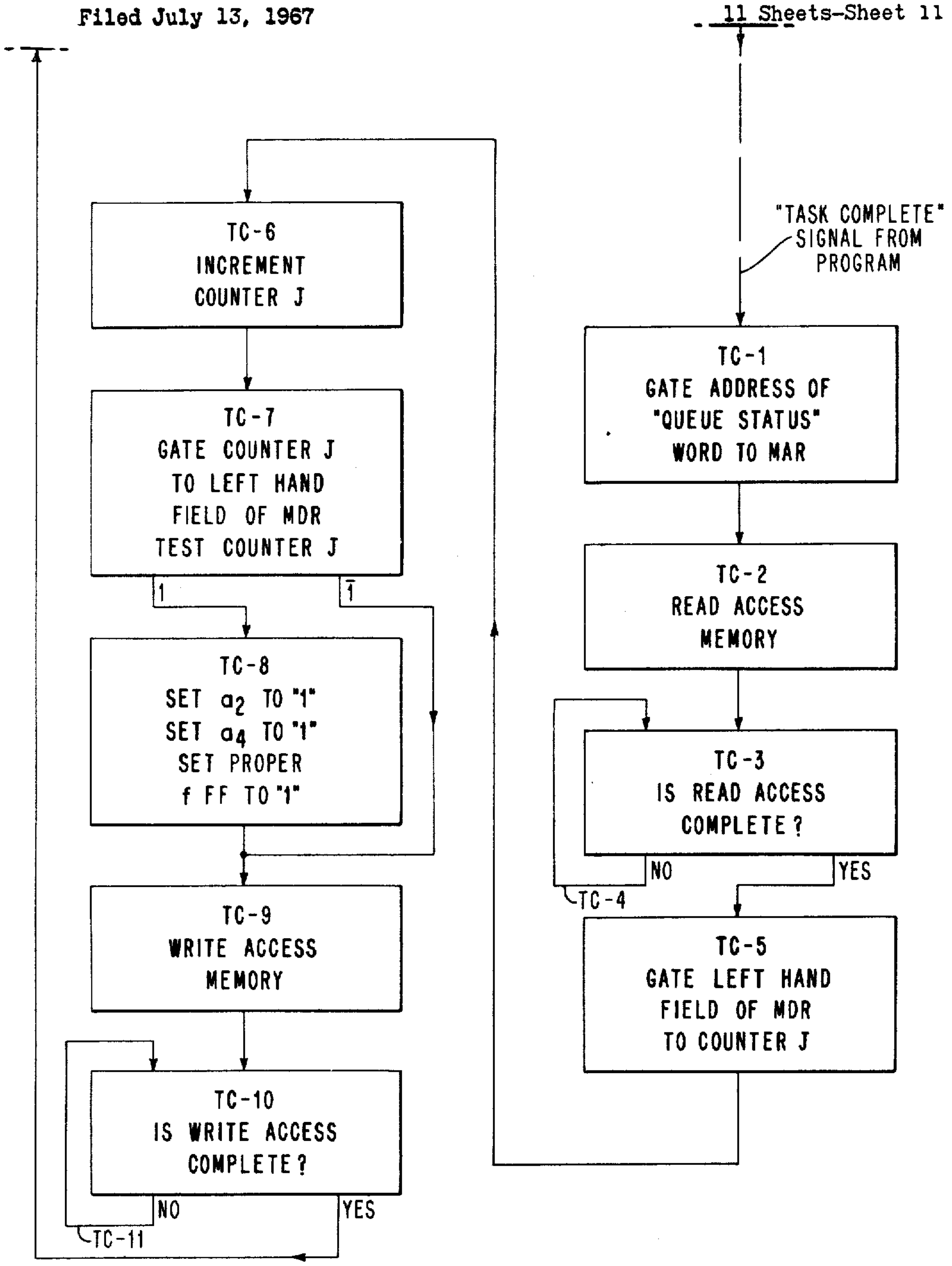

Before proceeding with the detailed description of the operation of the present system with respect to the logical schematic diagram of FIGS. 2A–G, a general description of the overall operating principles of the system with respect to the general functional block diagram of FIG. 1 and the flow charts of FIGS. 3A–C will follow. This section will set forth the general operational principles involved and describe generally the use of the various special registers and the three clock sequences involved with the operation of the present system.

For purposes of describing the present invention, it will be assumed that potential tasks awaiting availability of processing units in a multi-processing system organized according to the teaching of the present invention are arranged in any one of several work-queues according to their class. Examples of such essential procesor queues might be batch-proccessing, time sharing, diagnostic and maintenance, or an interruption queue. It is assumed that these queues are organized and stored in central memory by the supervisor and that each queue would have an allocated section of memory beginning with some fixed determinable address and that successively entered tasks would be progressively entered at address increments from said base address. However, this method of storage is well known in the art and need not be further explained.

The present invention provides a flexible and simple means for determining in advance of termination of a current task from which queue a unit is to obtain its next task. The disclosed system also allows a supervisory program or an operator at the system console to decide how many active units shall be assigned to each type of task when the system is fully loaded and would also impliedly allow the operator or programmer to alter such allocation at any time. Stated alternatively, quotas are assigned to each queue; the quotas for queues served by each type of active unit should add up to the total number of units of that type currently operating in the system. Thus, when the quota for a given type of task exceeds the number of available tasks of that type, there will be extra active units. These units may cyclically service other queues in the system so that these other queues will all receive service in excess of their stated quotas. When the number of available tasks of such a type, again equals or exceeds the quota, units will be assigned to these tasks as they complete other tasks until the quota is filled.

Because the task selection capability is distributed throughout the processing system, high reliability will be achieved. A single failure within the selection mechanism or a processor would at most isolate that particular proc essor leaving other processors and associated control units with their full task selection powers and operational capabilities.

As stated previously, the individual queues are physically stored in central memory and would normally physically constitute a list of memory addresses which would in fact be the beginning addresses of the individual tasks of said queue. Also stored with said queue in memory, although not necessarily adjacent thereto, is a "Queue Status Word" which will be described in detail subsequently insofar as its use is concerned but which contains an integer number (the "residual quota") representative of the quota for the queue, a potrion of the address of the next task of said queue and finally the number of said tasks currently stored in the queue. As will be apparent, the quota may be changed by placing a different number in the quota field of said "Queue Status Word." To change a quota, a supervisor would simply add algebraically the amount of the change to the residual quota in the "Queue Status Word."

When a processor picks up a task from a queue, it must reduce the associated residual quota by one indicating that this queue is now entitled "To one fewer processor." Similarly, when it terminates a task, the quota must be increased by one. If a residual quota is found to be zero or negative, the quota has been filled; if it is zero, exactly the predetermined number of units are working on tasks of a corresponding type; while if it is negative, extra units are working on such tasks, having found a dearth of tasks in some other queue.

Each time a processor picks up a task from a queue, it must also decrement the number representing the number of tasks currently in that queue by one. If this number should become zero, all other processors must be notified in order that they not waste time by attemtping to extract a task from the queue when in fact no tasks exist in same.

The necessary circuitry and controls for performing these communication operations is included in the Interaction Controller shown in FIG. 1 and described in copending application Ser. No. 607,040 of H. P. Schlaeppi. One such Interaction Controller is associated with each processor or active unit and these controllers are linked by a single common bus, the control and use of which are described for example in the previously cited copending application Ser. No. 653,535 filed July 14, 1967 of G. C. Driscoll.

Having thus described the objectives and operation of the system in a general fashion, the specific manner in which these objectives are accomplished will now be described with reference to the preferred embodiment of the invention disclosed in FIGS. 1–4. Referring to FIG. 1, there is shown a very general functional block diagram of a Processor and Interaction Controller is envisioned by the present system. It will be noted that five Registers are shown, three within the Interaction Controller and two between the Processor and the Interaction Controller. The Registers *e*, *f*, and *s* are strictly internal to the Interaction Controller. The Registers *n* and *a* can be read and set by the Interaction Controller and in addition Register *n* can be read by the associated Processor or channel and Register *a* can be both set and read by the Processor or channel.

The *e* Register is the "queue-empty" Register and has as many positions as there are queues in the system. In the present embodiment essentially four queues are disclosed, however it will of course be understood that there could be many more. A "1" in a particular position of this register indicates that the corresponding queue is nonempty. Conversely, a binary "0" indicates that the queue is empty, i.e., no more tasks remain in same.

The *f* Register is the "quota filled" Register and as with Register *e*, has as many positions therein as queues in the system. A binary "1" in a given position indicates that the quota of processing units for this corresponding queue is unfilled.

The *s* Register is the "scan" Register and again is the same length as the *e* Register containing a storage position for each queue in the system. On any given system cycle, this register will contain a single "1" and indicates the particular queue being considered by the logic circuitry of the selection system.

The *n* Register is the "next task" Register and is the same length as the above described registers. This register is normally loaded from the *s* Register and at any one time will only contain a single "1" therein. This "1" indicates the next task queue which will be taken up by the system if other criteria are met as will be described subsequently.

The *a* Register is a special function register for indicating a number of special conditions such as "interrupt," contents of *n* Register not valid at the moment, contents of *n* Register just used by processor, respecify certain data to other Interaction Controllers, and other operations which will be described subsequently.

Generally, these registers function in the following manner. The Registers *e* and *f* are scanned under control of the *s* Register starting from a given point to determine the next queue which has an unfilled quota and which also has tasks remaining in same. If such a queue is found, this will be the next task picked up by the system. However, if no queue satisfies this criteria, on the next search cycle the first queue having tasks remaining in same will be selected regardless of the quota. The contents of the *s* Register are transferred to the *n* Register and the *n* Register is utilized to control the selection of the next task through addressing means to be described subsequently.

Figure 4:
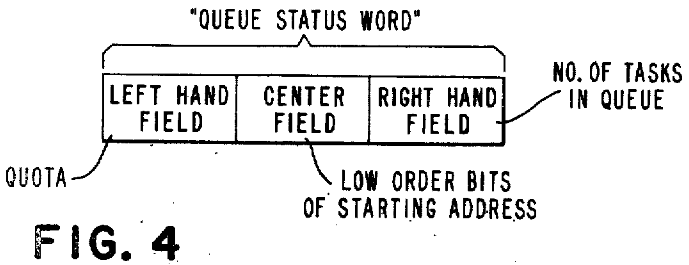
FIG. 4 is a diagrammatic illustration of the contents of a "Queue Status Word" which is associated with each queue stored in the central memory.

FIG. 4 is a diagrammatic representation of a "Queue Status Word" as utilized with the present invention. As stated previously, there is such a word for each of the queues in the system stored at a predetermined location in memory. The addresses of these "Queue Status Words" in memory are stored in the individual address registers 154 in each of the Interaction Controllers (FIG. 2E). As indicated in the figure, the left-hand portion of the "Queue Status Word" contains a number of bits representing the quota for the particular queue. This quota, as stated previously, is inserted by the programmer and may be changed at will. Any time a positive integer appears in this portion, it is automatically known that the quota for that particular queue is unfilled. Even though a current number appearing in this location for a particular queue is currently "0," this merely means that the desired number of processors are currently working on the queue and as each terminates a job, its termination pulse will cause this location to be incremented by one and the ultimate quota number returned or rebuilt in the "Queue Status Word" as tasks are completed.

The middle field of the "Queue Status Word" is utilized to store the low order bits of the address in memory of the next task of the particular queue. This address together with the encoded output of the *n* Register may be utilized to obtain the starting address per se of the next task from Main Memory.

The right-hand section of the "Queue Status Word" contains a number representative of the current number of tasks in said queue as tasks are added to or withdrawn from the queue, this number will be incremented or decremented accordingly as will be set forth subsequently. As stated previously, the contents of a specific storage location of all of the "Queue Status Words" are specified by the supervisor or programmer.

The organization of FIGS. 2A–G is shown in FIG. 2. FIGS. 2A–G themselves constitute a logical schematic diagram including all of the controls necessary in the Interaction Controller associated with each Processor and showing the relative location and access to the various Registers *e, f, s, a*, and *n*. In addition, on FIGS. 2F and 2G connection is shown to a central memory having an associated Memory Address Register (MAR) and a Buffer Register (MDR) for gating data into and out of the central memory. While this memory is shown as directly connected to the illustrated Interaction Controller, it will be understood that this is a central Memory serving the entire system and that suitable means for addressing same, resolving conflicts of use, etc. would be incorporated in the system. The details for multiple access to such a memory are well known in the art and the inclusion of same in the present application would merely tend to obfuscate the invention. As stated previously, all of the major registers described with reference to FIG. 1 appear on this composite diagram of FIG. 2 and are indicated by the dotted lines surrounding the various flip-flops comprising same and referred to on the drawing by an appropriate legend such as *s* Register. The individual logical and functional components of this drawing are considered to be old and well known in the art and accordingly are not detailed individually as they are comprised of conventional AND circuits, OR circuits, bistable flip-flops (FF), conventional GATE circuits, storage registers and counters. It should be noted that these various components could be fabricated in any of the currently available technologies such as tube, semiconductor, or integrated circuit and that the specific details of construction form no part of the present invention.

Before proceeding further with the specific description of the operation of the system of FIG. 2, the following general description of the three principal timing sequences will serve to generally introduce the operation of the detailed system.

Three distinct timing sequences are utilized in the present system. The first entitled the "Next Task" Sequence performs the function of scanning the *e* and *f* Registers under control of the *s* Register to determine the next task which the Processor should take up after completing its current task or upon initially starting up. The performance of this clock sequence results in setting a single position of the *s* Register to a binary "1" which position is indicative of or points to the paticular queue which the processor should next service.

The "Pick Up Task" Sequence involves the interrogation of the *s* Register which has been set by the aforementioned "Next Task" Sequence and utilization of information access the proper "Queue Status Word" (to be hereinafter referred to as "QSW"). By utilizing the setting of the *n* Register and the middle field of the QSW, the beginning address of the next task stored in memory may be determined as will be more specifically described subsequently. Additionally, the "Pick Up Task" Sequence causes the quota and the number of task fields in the QSW to be decremented upon picking up a task and makes certain additional tests to see if the *e* or *f* Registers in those locations corresponding to the current queue being serviced are to be respecified. Thus, in essence, this clock sequence allows the processor to actually access the next task and makes certain status changes in the QSW.

The final clock sequence is the "Task Complete" Sequence. Upon the completion of the task by the processor, this sequenec is initiated and it reaccesses the requisite QSW for the particular task just completed, and readjusts its quota by incrementing by one and then examines this quota to determine if it is necessary to reset the corresponding field of the *f* Register to a binary "1." This latter operation is necessary since if this field of the QSW has previously been set to a "0," the corresponding bit of the *f* Register would have been set to a "0" thus indicating that the quota for that particular queue was full whereas after the completion of the task by the current processor this situation might no longer apply.

The specific operations and tests performed in the various clock sequences are set forth subsequently in the Timing Sequence Charts for each of these clock sequences. The "Pick Up Task" and the "Task Complete" sequences are additionally shown in flow chart form in FIGS 3A–C. It should be clearly understood that these clocks could simply be a set of single shots possessing the ability to produce a first output pulse when turned on and a second output pulse a fixed time later when the clock turns off. Thus, any of the given clock sequences may be initiated by the turn off of a previous clock or by an output appearing on a certain output line from the logical circuitry of FIG. 2 such as from gates 172, 178, 192, and 213 appearing at the bottom of FIG. 2G. It will be noted that the input pulse to certain of these gates come from preceding clock stages and depending upon which of the output lines is up, the particular clock sequence will branch accordingly. The individual clock stages have not been shown specifically as they are thought to be obvious to a person skilled in the art and would consist of nothing of a series of blocks having labelled inputs and outputs.

Having thus generally described the three major clock sequences, the operation of the system referring to the Timing Sequence Charts, the flow charts of FIGS. 3A–C and the logical schematic of FIGS. 2A–G will now be set forth.

The description of the preferred embodiment of FIGS. 2A–G will now be set forth with reference to said figure and also the flow chart of FIGS. 3A–C. This description will proceed through the three logical clock sequences set forth previously, i.e., "Next Task," "Pick Up Task," and "Task Complete." In each section a Timing Sequence Chart is included setting forth the specific operations performed during each clock cycle. Reference to these charts, while reading the description, will clarify the operation of the system as each step is clearly set forth and the tests made at branch points are clearly designated.

NEXT TASK SEQUENCE

The circuitry used to perform this scan is shown on FIGS. 2A–D. Flip-flops 10, 12, 14, and 16 constitute the *s* Register. There are as many positions in this register as there are queues. Only one bit of this register can be set to "1" at any one time and this bit will indicate the queue from which the processor will take its next task. The setting of the *s* Register will be dependent on the setting of the *f* and *e* Registers which are the same length as the *s* Register. The *s* Register (F.F.'s 10, 12, 14, and 16) with its associated circuitry constitutes a form of ring circuit. Only one of the *s* F.F.'s can be set to "1" at any one time and the one that is set to '1" is called the "pointer." When the ring is operated in the fashion to be described (with line 20 active) an interrogating pulse on line 24 will enter the ring at the "pointer" positions and will find the first non-empty queue that also has an unfilled quota and the first position interrogated will be the position of the pointer. However, as will be described subsequently, this one applies to the start up cycle and respecification cycles.

When the system is first started up, the leftmost bit of the *s* Register is set to "1" and all other bits are set to "0" by applying a pulse to line 18. The *s* Register then indicates that the first task should come from the queue indicated by the leftmost bit. However, this may be a poor choice because the quota for this queue may be filled or the queue may be empty. Therefore, the Next Task clock sequence will check this initial setting to see if it is valid and, if it is not, make a better choice. To do this, lines 20 and 22 are made active and a pulse is applied to line 24. Because F.F. 10 is on "1," the pulse on line 24 will extend through AND circuit 26, OR circuit 28 and will be applied to AND circuits 30 and 32. AND circuit 30 will be enabled because line 20 is active and will have an output on line 34 which extends to OR circuit 36. The output of OR circuit 36 will be applied to AND circuits 38 and 40. If both $f_0$ and $e_0$ are on "1," AND circuit 42 will have an output on line 44 which will extend through gate 46 and OR circuit 48 to enable AND circuit 38. AND circuit 38 will have an output on line 50 which will set F.F. 52 to "1." (F.F. 52 was set to "0" earlier by the application of a pulse to line 54.) A pulse is next applied to line 56 which gates F.F. 52 to F.F. 10

If the above-described events take place, the leftmost setting of the $s$ Register which was accomplished by the pulse on line 18 is a good choice. If it is a poor choice, AND circuit 42 will not have an output and OR circuit 58 will have an output which is effective to enable AND circuit 40. Under these conditions, the active state of line 34 will extend through OR circuit 36 and AND circuit 40 to AND circuits 60 and 62. AND circuit 60 will be enabled because line 20 is active and it will have an output on line 64 which extends to OR circuit 66. Because F.F. 12 is on "0" AND circuit 68 will be enabled and the output of OR circuit 66 will extend through AND circuit 68, OR circuit 70 and AND circuit 72 to line 74 which extends to OR circuit 76. The output of OR circuit 76 extends to AND circuits 78 and 80. A determination is now made to see if $f_1$ and $e_1$ are both on "1." If they are, AND circuit 82 will have an output and, if they are not, OR circuit 84 will have on output. If AND circuit 82 has an output, F.F. 86 will be set to "1," and this setting will be transferred to F.F. 12 when line 56 is pulsed. It should be noted that only one F.F. such as 52, 86, 88 or 90 can be set to "1" at any one time and that when line 56 is pulsed, the "1" setting will be transferred to one of F.F.'s 10 through 16 inclusive. The other F.F.'s (10 through 16) will be set to "0." If OR circuit 84 has an output, it will extend through AND circuit 80 and AND circuit 92 to line 94 which extends to the next order to the right. The active status of line 94 will extend through circuitry similar to that previously described and be effective to test AND circuits 96 and 98. If AND circuit 96 is enabled, F.F. 88 will be set to "1." If AND circuit 98 is enabled, line 100 will become active and will be effective to test AND circuits 102 and 104. If AND circuit 102 is enabled, F.F. 90 will be set to "1." If AND circuit 104 is enabled, line 106 will become active. It will be noted that line 106 extends back to the leftmost order and is effective to test AND circuits 108 and 110. For the example chosen, F.F. 10 is set to "1" and therefore AND circuit 108 is enabled. The active state of line 106 will thus exit on line 112 which goes to OR circuit 114. Thus, if there are no queues with unfilled quotas, OR circuit 114 will have an output. If this happens, line 116 is made active instead of line 22 and the interrogating pulse is again applied to line 24. This time the interrogation is only for a non-empty queue, starting at the pointer position. An examination of the circuit will show that the operation is exactly the same as before. The result of a pulse on line 24 will be one of three things as follows:

(1) The pointer will be left at the leftmost position.
(2) The pointer will be moved to a new position.
(3) The pulse on line 24 will exit via OR circuit 114 and will be used to indicate that all queues are empty.

The alternate mode of operation in which line 118 is held active instead of line 20 will now be described. In this type of operation the interrogating pulse on line 24 will enter the ring at the "pointer" stage but it will be diverted one stage to the right of the pointer for the first interrogation. In other words, the interrogating pulse on line 24 is not for the purpose of determining if the pointer is a good choice but rather to find the next task in the ring after the pointer position. The reason for this is that, after the initial system start up, and except during respectification (after the $e$ or $f$ vector has changed), the processor associated with the Interaction Controller is working on the task indicated by the pointer and thus the pointer position should not be considered when determining the next task. When a processor starts working on a task, that task is the one indicated by the pointer. Also, when a processor starts working on a task it asks its associated controller to look for the next task. The controller does this starting with the ring stage to the right of the pointer. The pointer will be moved to a new position if a suitable task is found or it may be retained in its old positions as a last choice provided the old position is the only one with a non-empty queue whose quota is unfilled or the only one with a non-empty queue. If all queues are empty, the interrogating pulse will, as described previously, exit via OR circuit 114.

Referring to FIGS. 2A–G, AND circuits 32 and 62 will be enabled by the active state of line 118. If it be assumed that the pointer is in the $s_0$ position, F.F. 10 will be on "1." AND circuit 26 will be enabled which will allow the interrogating pulse on line 24 to pass through AND circuit 26, OR circuit 28, AND circuit 32 and travel via line 120 to OR circuit 76 the output of which is applied to AND circuits 78 and 80. If AND circuit 78 is enabled, F.F. 6 will be set to "1." If AND circuit 80 is enabled, the pulse will extend through AND circuit 122, OR circuit 66, AND circuit 68, OR circuit 70, AND circuit 124 and line 126 to the next stage to the right. If no task is found to the right of the pointer, the pulse will come out of the nth stage on line 128 which goes back to the $s_0$ stage. If the $s_0$ queue is empty the pulse will go through AND circuit 40, AND circuit 62, OR circuit 130, AND circuit 108, line 112 to OR circuit 114. It should be understood that when an interrogation pulse exits via OR circuit 114 that the shift pulse on line 56 is not applied because it would destroy the pointer and there would be no way for the next interrogation pulse on line 24 to enter the ring.

Referring now specifically to the Timing Sequence Chart for the "Next Task Scan," these clock sequences will be described successively. The previous description of the operation of the $e$, $f$ and $s$ Registers should be kept in mind. As stated above, when the computer system is first started a pulse is applied to line 18, FIG. 3. Line 18 extends to FIG. 1 and is used to reset the $s$ Register. A branch circuit extends from line 18 on FIG. 2E to line 220 which is used to initially start the "Next Task" clock, i.e. NT–1. The NT–1 pulse is applied to gate 222, FIG. 2E, in order to test the $a_1$ flip-flop. If this flip-flop is on "1," the clock will branch to NT–3. NT–2 is used for delay only and returns the clock to NT–1. Clock pulse NT–3 is applied to line 54, FIG. 2D and is used to reset flip-flops 52, 86, 88 and 90 as previously described. The "$ef$" flip-flop on FIG. 2B is also reset to "1" by the NT–3 pulse. The NT–3 pulse is also applied to OR circuit 224, FIG. 2E, the output of which sets the "EOL" flip-flop to "0." The next clock pulse NT–4 is applied to OR circuit 226, FIG. 2D, the output of which feeds line 24 which was described previously. If a task is found, the "EOL" flip-flop will remain on "0." If a task is not found, OR circuit 114 will have an output which sets the "EOL" flip-flop to "1." The clock pulse NT–5 therefore tests the "EOL" flip-flop by applying a pulse to gate 228. If this flip-flop is on "0," the clock will advance to NT–6. If it is on "1," the clock will branch to NT–7. If a task has been found, then one of the flip-flops 52, 86, 88 or 90 will be set to "1," and it is necessary to transfer the setting of these flip-flops to the $s$ Register. This is done by the NT–6 pulse which is applied to line 56 as previously described. Also, because a task has been found, the $a_1$ flip-flop must be set to "0" which is done on FIG. 3 by the NT–6 pulse. The clock then reverts to NT–1 which keeps testing the $a_1$ flip-flop. As long as the $a_1$ flip-flop is on "0," the clock will merely oscillate between NT–1 and NT–2. The NT clock will not proceed beyond NT–2 until the $a_1$ flip-flop is set to "1" by the processor or by some other controller which respecifies the *e* or *f* Registers. It will be noted on FIG. 2E that when some other controller respecifies the *e* Register that a pulse will appear on line 230. When some other controller respecifies the *f* Register, a pulse will appear on line 232. These lines feed OR circuit 166, the output of which on line 168 is effective to set the $a_1$ flip-flop to "1." It will also be noted that on FIG. 2E that when line 18, line 230 or line 232 are pulsed that OR circuit 234 will have an output which sets the mode flip-flop to "1." The mode flip-flop controls lines 20 and 118 on FIG. 1, the purpose of which has been described above.

Going back to clock pulse NT–5, let it be assumed that the clock branched to NT–7. On FIG. 2 NT–7 is effective to set the "*ef*" flip-flop to "0." This makes line 116 active instead of line 22. On FIG. 1, NT–7 is applied to OR circuit 224, the output of which sets the "EOL" flip-flop to "0." The clock now advances to NT–8. NT–8 is applied to OR circuit 226 which brings up line 24. If a task is found, the "EOL" flip-flop will remain on "0" and if a task is not found, this flip-flop will be set to "1." Accordingly, clock pulse NT–9 tests the "EOL" flip-flop. It does this by applying a pulse to gate 230, FIG. 3. If a task has been found, the clock will branch to NT–6. If a task has not been found, the clock will branch to NT–1.

TIMING SEQUENCE CHART

"Next Task Scan"

Next Task (NT) Scan

NT–1:
- Test $a_1$ F.F.
- If on "0" →NT–2
- If on "1" →NT–3

NT–2:
- Delay Only
- →NT–1

NT–3:
- Reset F.F.'s 52, 86, 88 and 90 (FIG. 1)
- Set "*ef*" F.F. to "1" (this brings up line 22, FIG. 1)
- Set "EOL" F.F. to "0"
- →NT–4

NT–4:
- Scan for next task (apply pulse to line 24, FIG. 1)
- →NT–5

NT–5:
- Test "EOL" F.F.
- If on "0" →NT–6
- If on "1" →NT–7

NT–6:
- Respecify *s* (apply pulse to line 56, FIG. 1)
- Set $a_1$ to "0"
- →NT–1

NT–7:
- Set "*ef*" F.F. to "0" (this brings up line 116, FIG. 1)
- Set "EOL" F.F. to "0"
- →NT–8

NT–8:
- Scan for next task (apply pulse to line 24, FIG. 1)
- →NT–9

NT–9:
- Test "EOL" F.F.
- If on "0" →NT–6
- If on "1" →NT–1

PICK UP TASK SEQUENCE

The operation of the present system when it picks up a task is shown by the flow chart of FIGS. 3A–C and be the "Pick Up Task" Timing Sequence Chart which is abbreviated "PUT" and which is located at the end of this section.

Referring to FIGS. 3A–C and to FIGS. 2A–G, the PUT–1 clock pulse is applied to gate 150. If the $a_1$ flip-flop is on "1," the clock will branch to PUT–2. If the $a_1$ flip-flop is on "0," the clock will branch to PUT–3. The clock step PUT–2 is used for relay only and returns the clock to PUT–1. In other words, the clock will wait until the $a_1$ flip-flop is set to "0" in case it is not on "0" at the time the test begins. This assures that the "Next Task" Sequence has selected a new task to begin by the processor or that other system operations are completed. The clock pulse PUT–3 is applied to gate 152, FIG. 2, in order to gate the *s* Register to the *n* Register. It will be noted that the "1" side of each *n* flip-flop enables a register such as 154. There is one register 154 for each of the *n* flip-flops and each register 154 contains the address in Main Memory of the "Queue Status Word" (preloaded by the supervisor). The address of the "Queue Status Word" is thus available on cable 156. The PUT–4 clock pulse is applied to OR circuit 158, and this extends to gate 160. The address on the cable 156 is thus gated to the Memory Address Register 162 of the Main Memory by the clock pulse PUT–4. The clock pulse PUT–4 is also applied to line 164, which goes to OR circuit 166. The output of OR circuit 166 extends via line 168 to the "1" side of the $a_1$ flip-flop. The PUT–4 pulse on line 164 also extends via line 170 to set the MODE flip-flop to "0." The PUT–5 clock pulse is applied to OR circuit 164, FIG. 4 in order to obtain a "read" access of the main memory. Flip-flop 166 is also set to "1." The clock then advances to PUT–6 which tests flip-flop 166. If flip-flop 166 is set to "1," the clock branches to PUT–7 which is used for delay only and which returns the clock to PUT–6. When the memory access is complete, flip-flop 166 will be set to "0" and the clock will branch to PUT–8. PUT–8 is applied to gate 168, FIG. 4, to gate the right-hand portion of the MDR of the Main Memory to Counter *j*. Counter *j* is applied to the decoder 170 and this decoder is tested by the PUT–9 clock pulse which is applied to gate 172, FIG. 4. If counter *j* is on "0" which indicates that there are no tasks in the queue, then the clock branches back to PUT–1 and tries again. If there is at least one task in the queue, the clock will branch to PUT–10. PUT–10 is applied to OR circuit 174 in order to decrement Counter *j*. Clock pulse PUT–11 is applied to gate 176, FIG. 2G, in order to gate Counter *j* back to the right-hand field of the MDR. In this step, the processor has removed one of the tasks from the queue. It is necessary at this time to test Counter *j* to see if it has gone to "0" or not. This is done by applying the PUT–11 pulse to gate 178, FIG. 2G. If Counter *j* has gone to "0," the clock will branch to PUT–12. If Counter *j* has not gone to "0," the clock will branch to PUT–13. Assuming that the clock did branch to PUT–12, the PUT–12 clock pulse is applied to OR circuit 180, FIG. 2E in order to set the $a_2$ flip-flop to "1." PUT–12 also sets the $a_3$ flip-flop to "0." When the $a_2$ flip-flop is set to "1," it is a signal to the controller that it must communicate with all other controllers in the manner previously referred to in copending applications Ser. Nos. 607,040 and 653,535. In this particular example, when it communicates with all other controllers, it must respecify the *e* Register in said other controllers. This is necessary because PUT–12 is also applied to line 182, FIG. 2B and this will set one of the *e* Register flip-flops to "0." The particular flip-flop selected will depend on the setting of the *n* Register. It will be noted that only one flip-flop of the *n* Register is on "1" and therefore the gates which are supplied by the PUT–12 pulse on line 182 will permit only one of the *e* Register flip-flops to be set to "0." The turn off of PUT–12 advances the clock to PUT–13. PUT–13 is applied to OR circuit 184, FIG. 2G, which enables gate 186 which gates the left-hand field of the MDR to Counter *j*. Clock pulse PUT–14 is next applied to OR circuit 174, FIG. 2G, in order to decrement Counter *j*. In this way the quota is reduced by 1. PUT–15 is next applied to OR circuit 188 which enables gate 190. Gate 190 transfers the contents of Counter *j* back to the left-hand field of MDR. Clock pulse PUT–15 is also used to test the Decoder 170 to see if Counter *j* has gone to "0" or not. To do this, PUT–15 is applied to gate 192, FIG. 2G. If Counter *j* is on "0," the clock will branch to PUT–16. If it is not on "0," the clock will branch to PUT–17. Assuming that the clock branched to PUT–16, the clock pulse PUT–16 is applied to OR circuit 180, FIG. 2E in order to set the $a_2$ flip-flop to "1." PUT–16 also sets the $a_4$ flip-flop to "0." On FIG. 2A the PUT–16 pulse is applied to line 194 in order to set the proper *f* Register flip-flop to "0." When the *f* Register is altered in the manner just described, the controller must respecify this Register in all other controllers. The clock next advances to PUT–17 which is applied to gate 196, FIG. 2G in order to gate the center portion of the MDR to both Counter *j* and to Register K. The next clock pulse PUT–18 is applied to OR circuit 198, FIG. 2G, in order to increment Counter *j*. The next clock pulse, PUT–19, is applied to gate 200, FIG. 2G, in order to gate the contents of Counter *j* back to the center portion of the MDR. The next clock pulse PUT–20 is applied to OR circuit 202, FIG. 2F, in order to provide a "write" access of the memory. The output of OR circuit 202 also sets flip-flop 204 to "1." The next clock pulse PUT–21 tests gate 206 to see if the "write" access is complete or not. If the access is not complete, the clock will branch to PUT–22. If the "write" access is complete, the clock will branch to PUT–23. PUT–22 is used for delay only and returns the clock to PUT–21. Clock pulse PUT–23 is applied to gate 208 in order to gate the contents of Register K and the high portion digits to the MAR, 162 of the Main Memory. This is the address of the first instruction of the task that the processor is now about to perform. As explained previously, the center field of the "Queue Status Word" is used to indicate the low order bits at the starting address of the next task in the queue. For example, if there are six bits in this center field, this field could operate in modulo 64 fashion starting with six zeros and extending to six ones after which it would revert to six zeros. A six bit field would allow a maximum of 64 tasks in each queue. It would be the responsibility of the supervisor program to see that the number of tasks never exceeds the capacity of this field. The storage location active in the *n* Register would be encoded (FIG. 2F) to give the high order bits of the address of the next task. For example, if there were only four queues, then the *n* Register would have storage locations in it.

One bit could be encoded for example as "00" in binary. The next bit would be encoded as "01" in binary. The next bit would be encoded as "10" in binary and the last bit would be encoded as "11" in binary. This two bit field would then be tacked onto the left of the center field of the "Queue Status Word" in order to give the complete address of the next task. Actually, the bits in the *n* Register could be encoded to give any number desired and thus direct the system to any desired address in memory. The next clock pulse PUT–24 is applied to OR circuit 164 in order to provide a "read" access of the Main Memory. The next clock pulse PUT–25 is applied to gate 211, FIG. 2F, in order to test for completion of this "read" access. If the access is complete, the clock will branch to PUT–27. If it is not complete, the clock will branch to PUT–26. PUT–26 is used for delay only and returns the clock to PUT–25. When the access is complete, the clock will advance to PUT–27 which is applied to gate 212 and this will gate the MDR of the Main Memory to the Instruction Register of the Processor where the instruction will be decoded and the task will be started in the processor.

Referring to FIGS. 3A–3C, it will be noted that a dotted line after the box labelled PUT–27 is meant to represent the execution of the task. When the task is complete, a signal will be generated from the program which starts the "Task Complete" clock which is abbreviated "TC." It will be noted that the contents of the *n* Register have not been changed during the time that the task was being executed. Therefore, the particular *n* flip-flop which is in its "1" state is still pointing to the proper register 154, on FIG. 2E which is the address of the "Queue Status Word" desired in the Main Memory.

TIMING SEQUENCE CHART

"Pick Up Task"

PUT–1:
  Test $a_1$ F.F.
  If on "1" →PUT–2
  If on "0" →PUT–3
PUT–2:
  Delay only
  →PUT–1
PUT–3:
  Gate *s* Register to *n* Register
  →PUT–4
PUT–4:
  Gate Address of "Queue Status Word" to MAR
  Set $a_1$ to "1"
  Set "Mode" F.F. to "0"
  →PUT–5
PUT–5:
  Read Access Memory
  →PUT–6
PUT–6:
  Is Read access complete?
  no →PUT–7
  yes →PUT–8
PUT–7:
  Delay only
  →PUT–6
PUT–8:
  Gate right-hand portion of MDR to Counter *j*
  →PUT–9
PUT–9:
  Test Counter *j*
  If on "0" →PUT–1
  If not on "0" →PUT–10
PUT–10:
Decrement Counter *j*
  →PUT–11
PUT–11:
  Gate Counter *j* to right-hand field of MDR
  Test Counter *j*
  If on "0" →PUT–12
  If not on "0" →PUT–13
PUT–12:
  Set $a_2$ to "1"
  Set $a_3$ to "0"
  Set proper *e* F.F. to "0"
  →PUT–13
PUT–13:
  Gate left-hand field of MDR to Counter *j*
  →PUT–14
PUT–14:
  Decrement Counter *j*
  →PUT–15
PUT–15:
  Gate Counter *j* to left-hand field of MDR
  Test Counter *j*
  If on "0" →PUT–16
  If not on "0" →PUT–17
PUT–16:
  Set $a_2$ to "1"
  Set $a_4$ to "0"
  Set proper *f* F.F. to "0"
  →PUT–17

PUT–17:
Gate center field of MDR to Counter $j$ and to Register K
→PUT–18
PUT–18:
Increment Counter $j$
→PUT–19
PUT–19:
Gate Counter $j$ to center field of MDR
→PUT–20
PUT–20:
Write Access Memory
→PUT–21
PUT–21:
Is Write Access Complete?
no →PUT–22
yes →PUT–23
PUT–22:
Delay only
→PUT–21
PUT–23:
Gate Register K to MAR
→PUT–24
PUT–24:
Read Access Memory
→PUT–25
PUT–25:
Is Read Access Complete?
no →PUT–26
yes →PUT–27
PUT–26:
Delay only
→PUT–25
PUT–27:
Gate MDR to Instruction Register and proceed with task

TASK COMPLETE SEQUENCE

The first TC clock pulse which is TC–1 is applied to gate 158 in order to gate the address of the "Queue Status Word" to the MAR 162.

The TC clock next advances to clock pulse TC–2 which is applied to OR circuit 164, FIG. 2F, in order to provide a "read" access of the Main Memory. Clock pulse TC–3 then tests gate 210 for completion of the "read" access. If the "read" access is not complete, the clock will branch to TC–4. If the "read" access is complete, the clock will branch to TC–5. TC–4 is used for delay only and returns the clock to TC–3. TC–5 is applied to OR circuit 184, FIG. 2G, the output of which gates the left-hand field of the MDR to the Counter $j$. The clock next advances to TC–6 which increments Counter $j$ by applying the TC–6 pulse to OR circuit 198, FIG. 2G. TC–7 is next applied to OR circuit 188, FIG. 4 which enables gate 190 which gates the contents of Counter $j$ back to the left hand field of the MDR. At the same time the clock pulse TC–7 tests Counter $j$ to see if it is on "1" or not. It does this by testing gate 213, FIG. 2G. If Counter $j$ is on "1," the clock will advance to TC–8. If Counter $j$ is not on "1," the clock will advance to TC–9. Assume that the clock did advance to TC–8, the clock pulse TC–8 is applied to OR circuit 180, FIG. 2E in order to set the $a_2$ flip-flop to "1." Clock pulse TC–8 also is used to set the $a_4$ flip-flop to "1." On FIG. 2A the clock pulse TC–8 is applied to line 214 which sets the proper $f$ Register flip-flop to "1." The clock then advances to TC–9 which is applied, FIG. 2F, to OR circuit 202 in order to obtain a "write" access of the Main Memory. TC–10 is then applied to gate 216, FIG. 2F in order to test flip-flop 204. If the "write" access is not complete, the clock branches to TC–11. If the write access is complete, the clock branches to PUT–1. TC–11 is used for delay only and returns the clock to TC–10. It will be noted that when the clock is returned to PUT–1 that the PUT clock cannot proceed unless the $a_1$ flip-flop is on "0." If the $a_1$ flip-flop is on "1," it means that the "Next Task" clock which is abbreviated "NT" is in the process of finding the next task for the processor. It should be noted that the NT, PUT, and TC internal clocks in the Interaction Controller are separate from the Read Only Memory, which is the control shown for example, in copending application Ser. No. 607,040 of H. P. Schlaeppi.

TIMING SEQUENCE CHART

"Task Complete"

TC–1:
Gate address of "Queue Status Word" to MAR
→TC–2
TC–2:
"Read" Access Memory
→TC–3
TC–3:
Is "Read" Access Complete?
no →TC–4
yes →TC–5
TC–4:
Delay only
→TC–3
TC–5:
Gate left-hand field of MDR to Counter $j$
→TC–6
TC–6:
Increment Counter $j$
→TC–7
TC–7:
Gate Counter $j$ to left-hand field of MDR
Test Counter $j$
If on "1" →TC–8
If not on "1" →TC–9
TC–8:
Set $a_2$ to "1"
Set $a_4$ to "1"
Set proper $f$ Register F.F. to "1"
→TC–9
TC–9:
"Write" Access Memory
→TC–10
TC–10:
Is "Write" Access Complete?
no →TC–11
yes →PUT–1
TC–11:
Delay only
→TC–10

CONCLUSIONS

It is believed that the foregoing description of the operation of the present system as disclosed in its preferred form in FIGS. 2A–G together with the flow charts of FIGS. 3A–C and the timing sequence charts will allow a person skilled in the art to fully understand the operation of the present invention. While the system has particular advantage in a multi-processor system of the type disclosed herein and in the two previously referenced copending applications, it will be readily apparent that such a selection scheme might have utility in any multiprocessing system configuration wherein groups of tasks can be arranged in individual queues having a predetermined service criteria or quota. Similarly, while the present selection system has been indicated as being a part of an Interaction Controller, it will be readily understood that such circuitry or part thereof could be included directly with each processor and given the capability of running either concurrently with the processor or only when the processor is through with a particular task. Although in the latter case, a considerable portion of the advantage of the present system would be lost. Further, while the system has been disclosed in its logical schematic form, it is to be understood that the individual logical elements disclosed could be fabricated in any desired technology such as electron tube, semiconductor, or interrogated circuit technology. Further, while the present embodiment implies the same sequential scan of queues in each controller, it will be readily understood that different controllers could have a different scanning sequence or that they could begin each scan from the beginning of the queue list and thus give priority to certain queues.

Also, while the timing system for the present invention has been disclosed as a synchronous group of single shot clock stages connected to run in a predetermined fashion it should be understood by one skilled in the art that other suitable timing arrangements could be devised for this system with appropriate modifications in certain of the logical circuits disclosed.

While the invention has been particularly shown and described with reference to a preferred embodiment thereof, it will be understood by those skilled in the art that various changes in form and details may be made therein without departing from the spirit and scope of the invention.

What is claimed is:

1. In a multi-processor computing system including a plurality of individual processors and a central memory containing a plurality of task queues wherein each processor has a separate interaction controller capable of communicating with its own processor, said central memory and other interaction controllers, the improvement in said interaction controllers including means for selecting a task for a processor from said plurality of task queues which comprises:

means for selecting the next task from one of said queues based on a predetermined service criteria, said service criteria including an indication of the number of tasks currently in a given queue and the number of processors currently working on said tasks, means for extracting a task selected by said selection means and for temporarily changing the service criteria for the queue from which the task was selected, means operative on completion of a task by said processor to again change the service criteria for that particular queue.

2. A multi-processor computing system as set forth in claim 1 wherein said central memory containing said task queues includes means for storing an indication of the service criteria for each task queue stored therein and wherein said service criteria comprise a quota number for each queue indicative of the total number of processors of said system which should be working on each queue whenever tasks are available.

3. A multi-processor system as set forth in claim 2 wherein said means for storing the quota for each queue comprises means for storing an individual queue status word for each queue at a predetermined storage location in said memory addressable by said interaction controllers, said queue status word containing an indication of the current quota number for its queue, an address indicative of the beginning address of the next task in said queue, and an indication of the number of tasks currently appearing in said queue.

4. A multi-processor computing system as set forth in claim 3 wherein said means for selecting the next task includes two registers each having as many storage positions therein as there are queues in said system, and wherein corresponding storage locations in each of said registers is directly relatable to the same queue, the storage positions of said first register being settable to a first binary state when tasks remain in the corresponding queues and settable to a second binary state when the queues are empty, the second of said registers containing quota information for said queues wherein the setting of a storage position therein to a first binary state indicates that the quota is not filled and wherein the setting to the second binary state indicates that the quota is filled, means for sequentially scanning said two registers in parallel beginning at a predetermined point and for indicating the first pair of corresponding storage positions in said two registers both of which are set to said first binary state, and means for determining the queue corresponding to the storage position of said first two registers indicated by said scanning means and for extracting the queue status word corresponding to that queue.

5. A multi-processor computing system as set forth in claim 4 wherein said means for sequenutially scanning said two registers includes means operative in response to an unsuccessful scan of said two registers on a first scanning cycle for a storage location in both registers set to said first binary state for beginning a second scanning cycle beginning at said predetermined point for the first storage location in said second register set to said first binary state regardless of the setting of the corresponding storage location in said first register means and for providing an indication of the storage location in said second register means to said extraction means.

6. A multi-processor computing system as set forth in claim 5 wherein said means for sequentially scanning said first two registers includes a third register having as many storage locations as queues in said system and wherein each storage location of said third register means corresponds to a particular pair of storage locations in said first two register means, means for setting a single storage location of said third register means to a first binary state corresponding to an indication by said scanning means during either the first or second scanning cycles thereof and wherein all other storage positions of said third register means are set to a second binary state, means to initiate scanning of said first two registers under control of said third register means at the beginning storage locations of said first two register means when said system is initially started up and at the position in said first two register means immediately subsequent to the corresponding storage location in said third register means on subsequent scanning cycles.

7. A multi-processor computing system as set forth in claim 6 wherein said means for extracting a task selected by said selection means includes means for extracting the queue status word from central memory corresponding to the queue indicated by said selection means, means for decrementing the quota stored in said queue status word, means for extracting the current beginning address of the next task in said queue from said queue status word, means for incrementing said address in said queue status word, means for decrementing the number of tasks indication in said queue status word, and means for returning said queue status word to memory.

8. A multi-processor computing system as set forth in claim 7 wherein said extraction means further includes a fourth register means directly settable by said third register means, means for providing the address in said central memory of a particular queue status word corresponding to the setting of a storage location in said fourth register means to a first binary state and means for utilizing said address to extract the desired queue status word.

9. The multi-processor computing system as set forth in claim 8 including encoding means for utilizing the setting of a single storage location in said fourth register means to said first binary state to construct the address in memory of the next task in a desired queue.

10. A multi-processor computing system as set forth in claim 9 wherein said means operative on completion of a task by the processor to change the service criteria for the queue on which it was working comprises means for accessing the queue status word for said queue from the central memory, means for incrementing the quota number establishing said service criteria in said queue status word, and means for returning said altered queue status word to central memory.

11. A multi-processor computing system as set forth in claim 10 wherein said extraction means includes means for detecting when said quota number in a queue status word is decremented to zero, and means operative in response to said determination for setting the storage location in said second register means in each of said interaction controllers corresponding to the queue in which such a condition is detected to said second binary state.

12. A multi-processor computing system as set forth in claim 11 wherein said extraction means further includes means for detecting when the number of tasks number in a queue status word is decremented to zero and means responsive to said detection for resetting the storage location in the first register means in each of said interaction controllers corresponding to the queue currently being serviced by said extraction means to said second binary state.

13. A multi-processor computing system as set forth in claim 12 including means for causing said next task selection means to rescan the first and second register means for a next task if a storage location in said first or second register means is reset by a signal from another interaction controller between the time of completion of the last selection scanning cycle and the beginning of the next extraction means operating cycle.

References Cited

UNITED STATES PATENTS

| | | | |
|---|---|---|---|
| Re. 26,171 | 3/1967 | Falkoff | 340—172.5 |
| Re. 26,087 | 9/1966 | Dunwell et al. | 340—172.5 |
| 3,346,851 | 10/1967 | Thornton et al. | 340—172.5 |
| 3,343,135 | 9/1967 | Freiman et al. | 340—172.5 |
| 3,319,226 | 5/1967 | Mott et al. | 340—172.5 |
| 3,312,953 | 4/1967 | Wang et al. | 340—172.5 |
| 3,287,703 | 11/1966 | Slotnick | 340—172.5 |
| 3,287,702 | 11/1966 | Borck et al. | 340—172.5 |

GARETH D. SHAW, Primary Examiner